(12) United States Patent
Finn

(10) Patent No.: US 7,983,173 B2
(45) Date of Patent: Jul. 19, 2011

(54) SYSTEM AND METHOD FOR DETECTING LINK FAILURES

(75) Inventor: Norman W. Finn, Livermore, CA (US)

(73) Assignee: Cisco Technology, Inc., San Jose, CA (US)

( * ) Notice: Subject to any disclaimer, the term of this patent is extended or adjusted under 35 U.S.C. 154(b) by 1136 days.

(21) Appl. No.: 10/842,618

(22) Filed: May 10, 2004

(65) Prior Publication Data

US 2005/0249123 A1    Nov. 10, 2005

(51) Int. Cl.
  *G01R 31/08* (2006.01)
  *G06F 11/00* (2006.01)
  *G08C 15/00* (2006.01)
  *H04J 1/16* (2006.01)
  *H04J 3/14* (2006.01)
  *H04L 1/00* (2006.01)
  *H04L 12/26* (2006.01)
  *H04L 12/28* (2006.01)
  *H04L 12/56* (2006.01)

(52) U.S. Cl. ............... 370/242; 370/401; 714/48

(58) Field of Classification Search ............ 370/242, 370/244–253, 282, 401, 216, 218, 241, 256, 370/395.1, 400, 241.1; 714/1, 47, 48, 49
See application file for complete search history.

(56) References Cited

U.S. PATENT DOCUMENTS

| | | | | |
|---|---|---|---|---|
| 4,527,270 A | * | 7/1985 | Sweeton ................. | 714/47 |
| 5,131,010 A | * | 7/1992 | Derrenge et al. ........ | 375/347 |
| 5,596,715 A | * | 1/1997 | Klein et al. ............. | 714/43 |
| 5,884,041 A | * | 3/1999 | Hurwitz ................ | 709/228 |
| 5,959,972 A | * | 9/1999 | Hamami ................ | 370/228 |
| 6,032,194 A | | 2/2000 | Gai et al. | |
| 6,163,543 A | | 12/2000 | Chin et al. | |
| 6,169,729 B1 | * | 1/2001 | Feuerstraeter ........... | 370/296 |
| 6,202,114 B1 | | 3/2001 | Dutt et al. | |
| 6,219,739 B1 | * | 4/2001 | Dutt et al. .............. | 710/311 |
| 6,222,854 B1 | * | 4/2001 | Dove .................... | 370/465 |
| 6,304,546 B1 | | 10/2001 | Natarajan et al. | |
| 6,404,733 B1 | | 6/2002 | Shah et al. | |
| 6,457,055 B1 | * | 9/2002 | Hwong et al. .......... | 709/227 |
| 6,538,988 B1 | * | 3/2003 | Natarajan et al. ....... | 370/216 |
| 6,628,624 B1 | * | 9/2003 | Mahajan et al. ........ | 370/256 |
| 6,747,957 B1 | | 6/2004 | Pithawala et al. | |
| 6,782,884 B1 | | 8/2004 | Chen et al. | |
| 6,804,712 B1 | | 10/2004 | Kracht | |
| 6,882,626 B1 | | 4/2005 | Marathe et al. | |
| 7,089,383 B2 | * | 8/2006 | Ji et al. ................. | 711/162 |

(Continued)

OTHER PUBLICATIONS

"Notification of transmittal of the interanational search report or the declaration." For PCT/US05/15980 with the international filing date of May 9, 2005.

(Continued)

*Primary Examiner* — Xavier Szewai Wong
(74) *Attorney, Agent, or Firm* — Cesari and McKenna, LLP

(57) ABSTRACT

A system and method monitors links in a computer network and rapidly detects failures of such links. Network entities disposed at opposite ends of a link are provided with failure detection engines that signal their presence to each other. Thereafter, each failure detection engine ensures that its entity transmits a continuous stream to the other entity by sending either data frames or newly defined failure detection packets. If an interruption in this continuous stream is detected, then the failure detection engine concludes that the link has failed. In response, the failure detection engine preferably notifies other applications or protocols of the failure, and causes the link to be shut-down.

16 Claims, 9 Drawing Sheets

U.S. PATENT DOCUMENTS

| | | | |
|---|---|---|---|
| 7,092,361 B2* | 8/2006 | Puppa et al. | 370/242 |
| 7,120,834 B1* | 10/2006 | Bishara | 714/43 |
| 7,286,467 B1* | 10/2007 | Sylvain | 370/216 |
| 7,317,691 B2* | 1/2008 | Mills et al. | 370/252 |
| 2002/0021671 A1 | 2/2002 | Quinlan | |
| 2002/0049933 A1 | 4/2002 | Nyu | |
| 2002/0114272 A1 | 8/2002 | Stewart | |
| 2002/0178411 A1 | 11/2002 | Kohda | |
| 2003/0009511 A1* | 1/2003 | Giotta et al. | 709/201 |
| 2003/0035368 A1* | 2/2003 | Tanada | 370/216 |
| 2003/0161262 A1* | 8/2003 | Hosoi | 370/228 |
| 2004/0062254 A1* | 4/2004 | Kuzhiyil et al. | 370/401 |
| 2004/0085894 A1* | 5/2004 | Wang et al. | 370/216 |
| 2004/0160904 A1* | 8/2004 | Enomoto et al. | 370/256 |
| 2004/0218548 A1* | 11/2004 | Kennedy et al. | 370/254 |
| 2007/0022331 A1* | 1/2007 | Jamieson et al. | 714/712 |

OTHER PUBLICATIONS

Simpson, W., RFC 1661, entitled The Point-to-Point Protocol (PPP), Jul. 1994, pp. 1-41.

IEEE Draft P802.3ah/D3.3 (Amendment to IEEE Std 802.3-2002), Apr. 19, 2004.

Clause 57 of IEEE Draft P802.3ah/03.3, entitled Operations, Administration and Maintenance, Apr. 1, 2003.

Tolley, Bruce, IEEE 802.3ah Ethernet in the First Mile Update: Technology and Standards Update, Catalyst 4000 Enhances Control Announcement—SpS—01.02, Oct. 1, 2002, p. 1-13.

Daines, Kevin, EFM OAM Tutorial (Current as of IEEE P802.3ah/D1.732), May 15, 2003, page.

Tolley, Bruce, Cisco White Paper entitled Ethernet in the First Middle, Cisco Systems, Jun. 17, 2005, p. 1-18.

* cited by examiner

SYSTEM AND METHOD FOR DETECTING LINK FAILURES

BACKGROUND OF THE INVENTION

1. Field of the Invention

The present invention relates generally to computer networks, and more specifically, to a method and apparatus for quickly and efficiently detecting link failures.

2. Background Information

Many organizations, including businesses, governments and educational institutions, utilize computer networks so that employees and others may share and exchange information and/or resources. A computer network typically comprises a plurality of entities interconnected by means of one or more communications media. An entity may consist of any device, such as a computer, that "sources" (i.e., transmits) or "sinks" (i.e., receives) messages, such as data frames, over the communications media. A common type of computer network is a local area network ("LAN") which typically refers to a privately owned network within a single building or campus. LANs typically employ a data communication protocol (LAN standard), such as Ethernet, FDDI or token ring, that defines the functions performed by data link and physical layers of a communications architecture (i.e., a protocol stack).

Entities coupled on an Ethernet LAN may employ the Institute of Electrical and Electronics Engineers (IEEE) 802 family of protocols to communicate with each other over the LAN. Architecturally, an IEEE 802 LAN reference model includes a physical layer and a data-link layer which are often called Layer 1 (L1) and Layer 2 (L2) of the reference model, respectively.

The physical layer deals with transmitting and receiving a carrier that supports a data-bearing signal across a transmission medium. Functions performed at the physical layer typically include encoding/decoding signals, generating/removing preamble information used for synchronization, and transmitting and receiving bits on the transmission medium. The data-link layer handles data frames, and performs flow and error control. The data-link layer typically comprises a medium access control (MAC) layer and a logical link control (LLC) sub-layer. The MAC sub-layer assembles data to be transmitted into a frame with address and error detection fields, disassembles received frames, performs address recognition and error detection, and governs access to the LAN transmission medium. The LLC sub-layer provides an interface to higher layers and performs flow and error control.

One or more intermediate network devices are often used to couple LANs together and allow the corresponding entities to exchange information. For example, a bridge may be used to provide a "bridging" or "switching" function between two or more LANs or end stations. Typically, the bridge is a computer and includes a plurality of ports that are coupled via LANs either to other bridges, or to end stations such as routers or host computers. Ports used to couple bridges to each other are generally referred to as trunk ports, whereas ports used to couple bridges to end stations are generally referred to as access ports. The bridging function includes receiving data from a sending entity at a source port and transferring that data to at least one destination port for forwarding to one or more receiving entities.

Most computer networks include redundant communications paths so that a failure of any given link or network device does not isolate any portion of the network. Such networks are typically referred to as meshed or partially meshed networks. The existence of redundant links, however, may cause the formation of circuitous paths or "loops" within the network. Loops are highly undesirable because data frames may traverse the loops indefinitely. Furthermore, bridges replicate frames whose destination is not known. If loops are present, the traffic that results when frames are replicated can overwhelm the network.

To avoid the formation of loops, most bridges and switches execute a spanning tree protocol which allows them to calculate an active network topology that is loop-free (i.e., a tree) and yet connects every pair of LANs and/or end stations within the network (i.e., the tree is spanning). The Institute of Electrical and Electronics Engineers (IEEE) has promulgated a standard (IEEE Std. 802.1D-1998™) that defines a spanning tree protocol to be executed by 802.1D compatible devices. In general, by executing the 802.1D spanning tree protocol, bridges elect a single bridge within the bridged network to be the "Root Bridge". The 802.1D standard takes advantage of the fact that each bridge has a unique numerical identifier (bridge ID) by specifying that the Root Bridge is the bridge with the lowest bridge ID. In addition, for each LAN coupled to any bridge, exactly one port (the "Designated Port") on one bridge (the "Designated Bridge") is elected. The Designated Bridge is typically the one closest to the Root Bridge. All ports on the Root Bridge are Designated Ports, and the Root Bridge is the Designated Bridge on all the LANs to which it has ports.

Each non-Root Bridge also selects one port from among its non-Designated Ports (its "Root Port") which gives the lowest cost path to the Root Bridge. The Root Ports and Designated Ports are selected for inclusion in the active topology and are placed in a forwarding state so that data frames may be forwarded to and from these ports and thus onto the LANs and links interconnecting the bridges and end stations of the network. Ports not included within the active topology are placed in a blocking state. When a port is in the blocking state, data frames will not be forwarded to or received from the port. A network administrator may also exclude a port from the spanning tree by placing it in a disabled state.

To obtain the information necessary to run the spanning tree protocol, bridges exchange special messages called configuration bridge protocol data unit (BPDU) messages or simply BPDUs. BPDUs carry information, such as assumed root and lowest root path cost, used in computing the active topology. More specifically, upon start-up, each bridge initially assumes itself to be the Root Bridge and transmits BPDUs accordingly. Upon receipt of a BPDU from a neighboring device, its contents are examined and compared with similar information (e.g., assumed root and lowest root path cost) stored by the receiving bridge in memory. If the information from the received BPDU is "better" than the stored information, the bridge adopts the better information and uses it in the BPDUs that it sends (adding the cost associated with the receiving port to the root path cost) from its ports, other than the port on which the "better" information was received. Although BPDUs are not forwarded by bridges, the identifier of the Root Bridge is eventually propagated to and adopted by all bridges as described above, allowing them to select their Root Port and any Designated Port(s).

In order to adapt the active topology to changes and failures, the Root Bridge periodically (e.g., every hello time) transmits BPDUs. In response to receiving BPDUs on their Root Ports, bridges transmit their own BPDUs from their Designated Ports, if any. Thus, BPDUs are periodically propagated throughout the bridged network, confirming the active topology. As BPDU information is updated and/or timed-out and the active topology is re-calculated, ports may transition from the blocking state to the forwarding state and vice versa. That is, as a result of new BPDU information, a previously blocked port may learn that it should be in the forwarding state (e.g., it is now the Root Port or a Designated Port).

Rapid Spanning Tree Protocol

Recently, the IEEE promulgated a new standard (the IEEE Std. 802.1W-2001™ specification standard) that defines a Rapid Spanning Tree Protocol (RSTP). The RSTP similarly selects one bridge of a bridged network to be the Root Bridge and defines an active topology that provides complete connectivity among the LANs and/or end stations while severing any loops. Each individual port of each bridge is assigned a role according to whether the port is to be part of the active topology. The roles defined by the 802.1w specification standard include Root, Designated, Alternate and Backup. The bridge port offering the best, e.g., lowest cost, path to the Root Port is assigned the Root Port Role. Each bridge port offering an alternative, e.g., higher cost, path to the Root Bridge is assigned the Alternate Port Role. For each LAN, the one port providing the lowest cost path to the Root Bridge from that LAN is assigned the Designated Port Role, while all other ports coupled to the LAN are assigned the Root, Backup or, in some cases, the Alternate Port Role. At the Root Bridge, all ports are assigned the Designated Port Role.

Those ports that have been assigned the Root Port and Designated Port Roles are placed in the forwarding state, while ports assigned the Alternate and Backup Roles are placed in a discarding or blocking state. A port assigned the Root Port Role can be rapidly transitioned to the forwarding state provided that all of the ports assigned the Alternate Port Role are placed in the blocking state. Similarly, if a failure occurs on the port-currently assigned the Root Port Role, a port assigned the Alternate Port Role can be reassigned to the Root Port Role and rapidly transitioned to the forwarding state, provided that the previous Root Port has been transitioned to the discarding or blocking state. A port assigned the Designated Port Role, or a Backup Port that is to be reassigned to the Designated Port Role, can be rapidly transitioned to the forwarding state, provided that the roles of the ports of the downstream bridge are consistent with this port being assigned the Designated Port Role. The RSTP provides an explicit handshake to be used by neighboring bridges to confirm that a new Designated Port can rapidly transition to the forwarding state.

Like the STP described in the 802.1D specification standard, bridges running RSTP also exchange BPDUs in order to determine which roles to assign to the bridge's ports. The BPDUs are also utilized in the handshake employed to rapidly transition Designated Ports to the forwarding state.

With RSTP, bridges can now recover from failures quickly. Nonetheless, delays may still be caused due to the time it takes for the failures to be detected. That is, the process of converting a port assigned to the Alternate Port Role to become the new Root Port will not even begin until the failure at the existing Root Port is detected. Current techniques for overcoming these limitations to Layer 1 link failure detection either consume significant resources, such as processor or memory resources and/or bandwidth, or take so long to detect link failures as to reduce the efficiency of RSTP. Accordingly, a need exists for a technique to detect link failures quickly and efficiently.

SUMMARY OF THE INVENTION

Briefly, the present invention is directed to a system and method for monitoring operation of links in a computer network and for rapidly and efficiently detecting failures of those links. In an illustrative embodiment, the computer network includes a plurality of intermediate network devices, including two network devices, such as bridges, that are interconnected by a point-to-point link having a carrier that supports a data-bearing signal. Each bridge has a link establishment entity and is further configured to include a failure detection engine that is in communication with the respective bridge port coupled to the point-to-point link. The failure detection engine includes a message generator, one or more state machines and fast failure detector logic. In the illustrative embodiment, the state machine transitions selected ports among the enabling, working, disabling and failed states.

Upon establishment of the point-to-point link and thus the carrier, the two failure detection engines generate and exchange failure detection packets, thereby signaling their presence to each other. Thereafter, each failure detection engine ensures that its respective bridge transmits continuously on the link. Specifically, if the bridge has a network message to send on the link, the message is sent. If the bridge has no network message to send, the failure detection engine generates and sends a failure detection packet. Accordingly, the link remains fully utilized in both directions, carrying either network messages or failure detection packets. If a break in communication, i.e., an interruption in the receipt of network messages and/or failure detection packets is detected, then the failure detection engine concludes that the point-to-point link has failed. In response, the failure detection engine generates and sends a failure detection packet that contains a "force_down" message or signal. The failure detection engine subsequently causes the carrier to be dropped and the link to be shut-down. The bridge receiving the "force_down" failure detection packet similarly drops carrier and shuts down the link, assuming it has not already done so. Preferably, the two failure detection engines keep the link shut-down for a hold-down period. Upon expiration of the hold-down period, the failure detection engines permit the link establishment entity to run in an effort to re-establish the point-to-point link between the two bridges. If the link is re-established, the failure detection engines again exchange failure detection packet to signal their presence to each other.

In another aspect of the invention, the failure detection engine can be directed to terminate its failure detection operations. To do so, the failure detection engine generates and sends a failure detection packet containing a "disabling" message. After issuing the failure detection packet with the "disabling" message, the sending bridge stops issuing failure detection packets. Upon receiving the failure detection packet with the "disabling" message, the receiving bridge no longer expects to receive failure detection packets from the other bridge. The receiving bridge does not, however, conclude that the interruption in failure detection packets is a result of a failure of the link.

In a further aspect of the invention, a failure detection engine can be directed to shut-down the link, even though no failure has been detected. In this case, the failure detection engine generates and sends a failure detection packet that contains a "force_down" message. The bridge then drops carrier and shuts down the link. In response to receiving a failure detection packet with the "force_down" message, the receiving bridge drops carrier and shuts the link down for the hold-down period. At the expiration of the hold-down period, the bridge can again attempt to re-establish the link.

BRIEF DESCRIPTION OF THE DRAWINGS

The invention description below refers to the accompanying drawings, of which.

DETAILED DESCRIPTION OF AN
ILLUSTRATIVE EMBODIMENT

Figure 1:
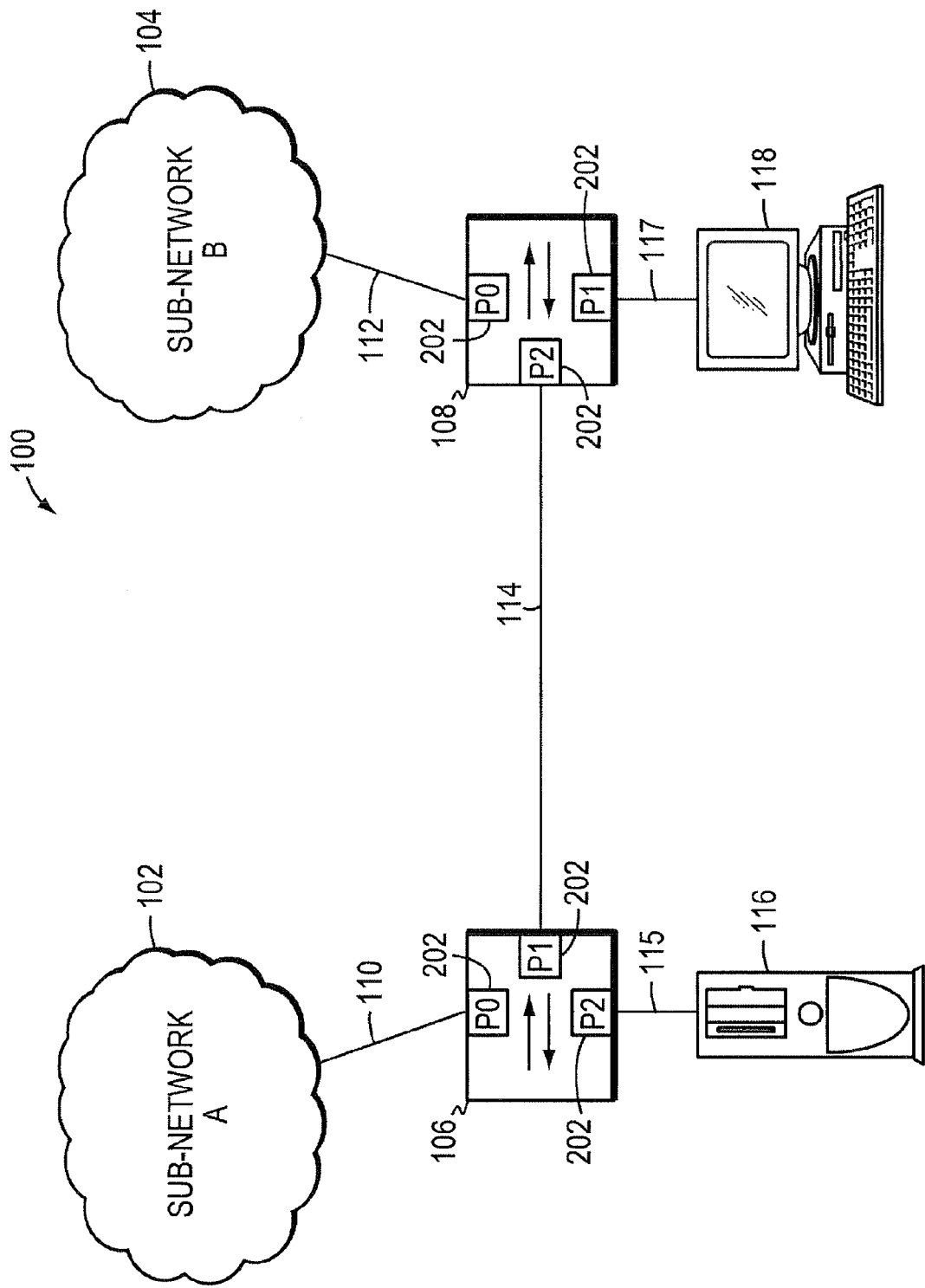
FIG. 1 is a highly schematic illustration of a computer network.

FIG. 1 is a highly schematic illustration of a computer network 100 that includes two sub-networks, e.g., sub-network A 102 and sub-network B 104. Computer network 100 further includes a plurality of, e.g., two, intermediate network devices 106, 108. Network device 106 is coupled by link 110 to sub-network 102, and network device 108 is coupled by link 112 to sub-network 104. In addition, the two network devices 106, 108 are interconnected by a point-to-point link 114. Coupled to each network device 106, 108 may be one or more local area networks (LANs) and/or end stations. For example, a server 116 is coupled to network device 106 via link 115, while a workstation or personal computer 118 is coupled to network device 108 via link 117. The two sub-networks 102, 104 preferably include a plurality of interconnected LANs, end stations and intermediate network devices (not shown).

Each network device 106, 108 has a plurality of ports 202, and is configured to switch or forward network messages that are received on a first port 202 to a second port 202 so that end stations 116 and 118 may communicate with each other and with other end stations disposed in the sub-networks 102, 104. Each network device 106, 108 identifies its own ports 202, e.g., by port numbers, such as port zero (P0), port one (P1), port two (P2), port three (P3), etc. Network devices 106, 108 are thus able to associate specific ones of their ports with the LANs, end stations and/or network devices coupled thereto.

It should be understood that the computer network 100 of FIG. 1 is meant for illustrative purposes only and that the present invention will operate with other networks having possibly far more complex topologies. It should further be understood that network devices 106, 108 might be hubs, bridges, switches or routers, or devices supporting various combinations of the functionality thereof. The present invention, moreover, can be advantageously utilized with other network entities besides intermediate network devices. For example, the invention can be used with end stations, such as servers, workstations, personal computers, etc., and nothing herein is intended to limit the application of the invention.

Figure 2:
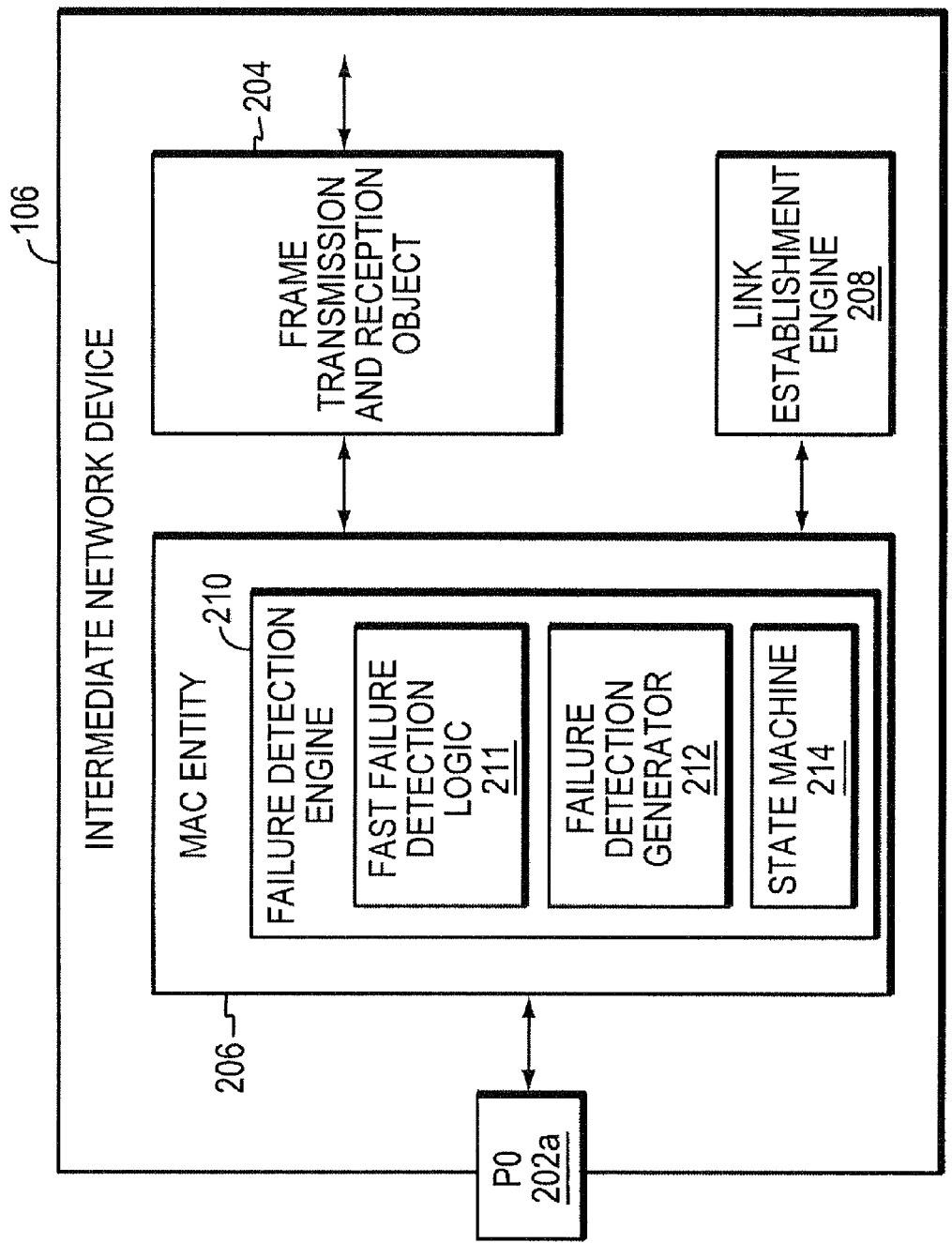
FIG. 2 is a partial functional block diagram of an intermediate network device configured in accordance with the present invention.

FIG. 2 is a partial functional block diagram of the network device 106 of FIG. 1. In particular, FIG. 2 illustrates just one port, i.e., port P0 202a, and its associated components. Associated with each port, such as port P0, is a Media Access Control (MAC) entity 206. In accordance with the invention, each MAC entity 206 has a failure detection engine 210. Each failure detection engine 210, moreover, preferably has a plurality of subcomponents, including fast failure detection logic 211, a failure detection packet generator 212 and a state machine 214. In addition to the MAC entity 206, there is also a link establishment engine 208. One or more frame transmission and reception objects, such as object 204, is associated with port 202b such that network messages, including data and control frames, received at port P1 may be captured, and frames to be transmitted by network device 106 may be delivered to port P1. Frame reception and transmission object 204 is typically a message storage structure, such as a priority queue.

Network device 106 may have a single link establishment engine 208 for all of its ports or it may have multiple engines 208.

Although only a single port is illustrated in FIG. 2, those skilled in the art will understand that network device 106 typically includes a plurality of ports each of which is preferably identified by a number (e.g., P0-P2). Furthermore, the plurality of ports at device 106 may be established through one or more line cards and/or network interface cards (NICs). Device 106 may also have one or more or central processing units (CPUs) and/or microprocessors, and associated memory devices for performing calculations and one or more bus structures. Device 106 may also (but need not) have other components, such as a forwarding engine, one or more filtering databases, a Spanning Tree Protocol (STP) engine, etc.

Figure 3:
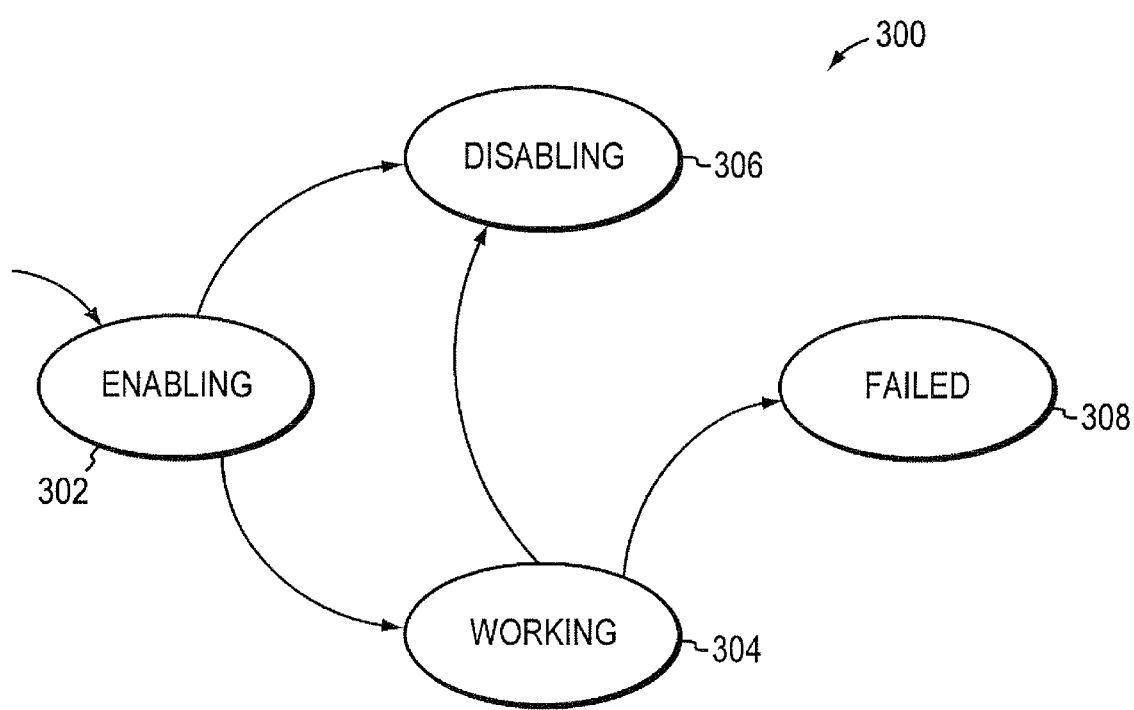
FIG. 3 is a highly schematic illustration of a state diagram in accordance with the present invention.

FIG. 3 is a highly schematic state diagram 300 in accordance with the present invention. In the preferred embodiment, a port 202 may be in any one of five possible failure detection states: an enabling state 302, a working state 304, a disabling state 306 and a failed state 308. The enabling state 302 is entered when a port first begins to run the failure detection protocol of the present invention. The working state 304 is entered when the two ports connected by a point-to-point link have established and are running the failure detection protocol. The disabling state 306 is used when failure detection operations are to be terminated, and the failed state 308 is used when a failure has been detected and the link is about to be brought down.

In the illustrative embodiment, the failure detection engine 210 is implemented in hardware, such as through one or more Application Specific Integrated Circuits (ASICs) and/or Field Programmable Gate Arrays (FPGAs) having registers and combinational logic configured and arranged to produce sequential logic circuits and state machines, or through other fabrication techniques. Nonetheless, those skilled in the art will recognize that the present invention may be implemented in the form of one or more software modules or libraries containing program instructions capable of being stored on electronic, magnetic and/or optical media, and also capable of being transmitted electronically and/or optically. The program instructions pertain to the methods described herein, and are executable by one or more processing elements (not shown) of network device 106. Various combinations of hardware, software and firmware may also be utilized.

Suitable intermediate network device platforms for use with the present invention include, but are not limited to, the commercially available Catalyst 4000 and 6000 series of switches from Cisco Systems, Inc. of San Jose, Calif.

Computer networks, including network 100, typically utilize a communication architecture or protocol stack to support communication among the end nodes of the network. The protocol stack is organized, at least logically, into a plurality layers, and the end nodes and network devices have hardware, software and firmware components configured to operate at various of these layers. Among other things, the layers of the protocol stack specify the format of data being transferred between a source station and a destination station disposed within the computer network. Each layer also provides predetermined services as the data is passed through that layer. In general, the lower layers are standardized, and are typically implemented in hardware and firmware, whereas the higher layers are often implemented in software.

Figure 4:
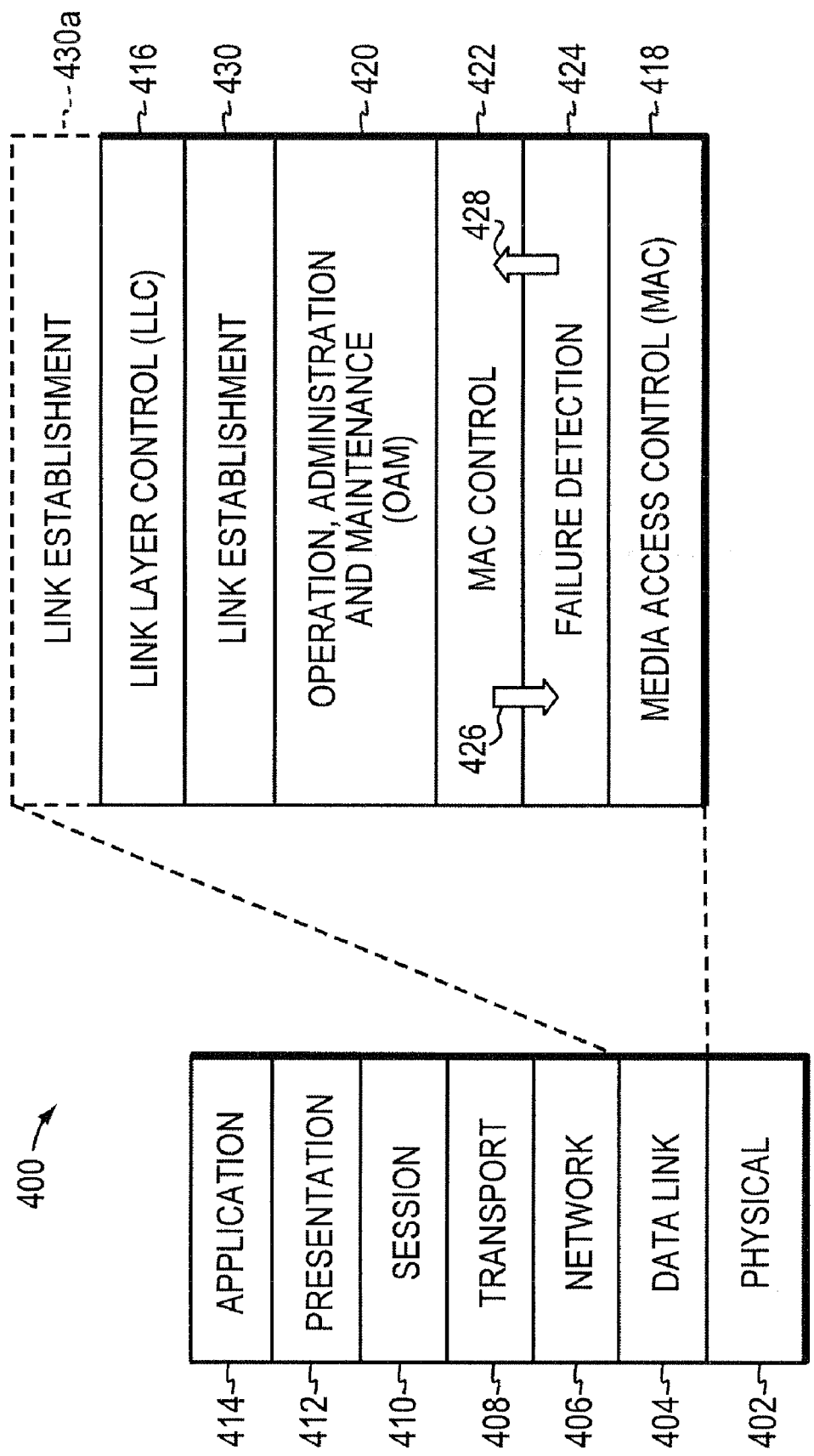
FIG. 4 is a highly schematic illustration of a communication architecture organized as layers.

FIG. 4 is a highly schematic illustration of a protocol stack 400 in accordance with the Open Systems Interconnection (OSI) model. This model defines seven layers, which are termed, in ascending order, physical 402, data link 404, network 406, transport 408, session 410, presentation 412 and application 414. The physical layer 402 is concerned with the actual transmission of signals across the communication channel, such as a wire, and defines e.g., the types of cabling, plugs and connectors used in connection with the channel. The data link layer 404, also referred to as Layer 2 (L2), is responsible for data transmission. The network layer 406, also referred to as Layer 3 (L3) provides network routing. The transport layer 408, also referred to as Layer 4 (L4), supports end-to-end reliability.

The session layer 410 allows users on different machines to establish sessions between them. A session may support services beyond those provided by the transport layer, such as allowing a user to log-in to a remote timesharing system. The presentation layer 412 is used to perform commonly requested functions, such as encoding data in a particular manner. The application layer 414 contains high-level applications, such as virtual terminal software, file transfer software, electronic mail, etc.

As shown in FIG. 4, the data link layer 404 is divided into a plurality of sub-layers, including a link layer control (LLC) sub-layer 416, and a Media Access Control (MAC) sub-layer 418. Recently, in a draft protocol standard, known as IEEE Draft P802.3ah (the current version of which is Draft 3.3 dated Apr. 19, 2004), which is hereby incorporated by reference in its entirety, the Institute of Electrical and Electronic Engineers (IEEE) has defined several additional sub-layers within the data link layer 404. Specifically, the IEEE has defined an Operation, Administration and Maintenance (OAM) sub-layer 420 and a MAC Control sub-layer 422 both of which are disposed between the LLC and MAC sub-layers 416 and 418. In accordance with the present invention, a new sub-layer is provided within the data link layer 404. Specifically a Failure Detection sub-layer 424 is provided that is preferably disposed between the OAM and the MAC control sub-layers 420 and 422. As described herein, the failure detection engine 210 (FIG. 2) of the MAC entity 206 preferably operates within this new Failure Detection sub-layer 424. In addition, a link establishment sub-layer 430 is preferably disposed between the LLC and OAM sub-layers, although those skilled in the art will recognize that it may located in other positions, such as above the LLC sub-layer 416, as shown in dotted line format 430a.

Network devices may operate at various levels of the protocol stack 400. For example, a bridge may operate at the data link layer or layer 2. Data frames at the data link layer typically include a header containing the MAC address of an entity sourcing the message, referred to as the source address, and the MAC address of an entity to whom the message is being sent, referred to as the destination address. To perform the bridging function, layer 2 bridges examine the MAC destination address of each data frame received on a source port, and switch the frame onto the destination port(s) that have been associated with that MAC destination address.

Other network devices, commonly referred to as routers, may operate at higher communication layers, such as the network or layer 3 of the OSI or TCP/IP Reference Models. Data frames at L3 layer also include a header. The header of a L3 data frame include an IP source address and an IP destination address. Routers or L3 switches may re-assemble or convert received data frames from one LAN standard (e.g., Ethernet) to another (e.g. token ring). Thus, L3 network devices are often used to interconnect dissimilar subnetworks.

In the illustrative embodiment, network devices 106 and 108 are preferably bridges operating at L2. Nonetheless, those skilled in the art will recognize that network devices 106 and/or 108 may operate at higher layers of the protocol stack 400, such as switches or routers operating at L3, L4 or even higher.

The failure detection technique of the present invention is designed for use on point-to-point links extending between any two network entities, such as but not limited to link 114 extending between network devices 106 and 108, link 115 extending between network device 106 and server 116, and link 117 extending between network device 108 and workstation 118. It is not to be used on a shared medium, such as a LAN segment containing more than two devices that share the LAN segment.

As described herein, the failure detection technique of the present invention allows failures to be identified much sooner than otherwise possible with the prior art approaches. In addition, the failure detection technique of the present invention can be terminated without having to shut down or suspend operation of the link.

Figure 5A:
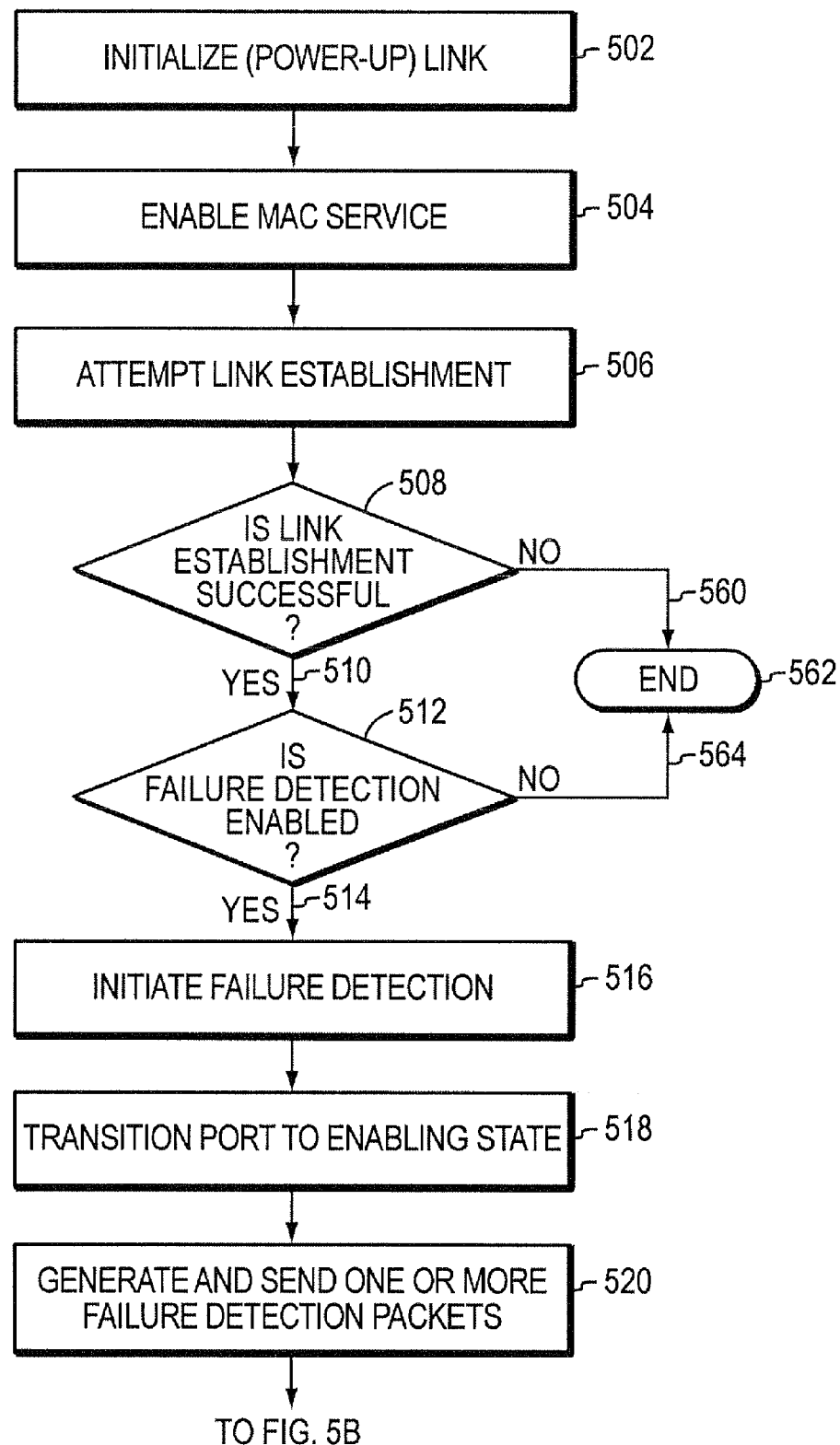
FIGS. 5A-C is a flow chart of a preferred method in accordance with the present invention.
Figure 5B:
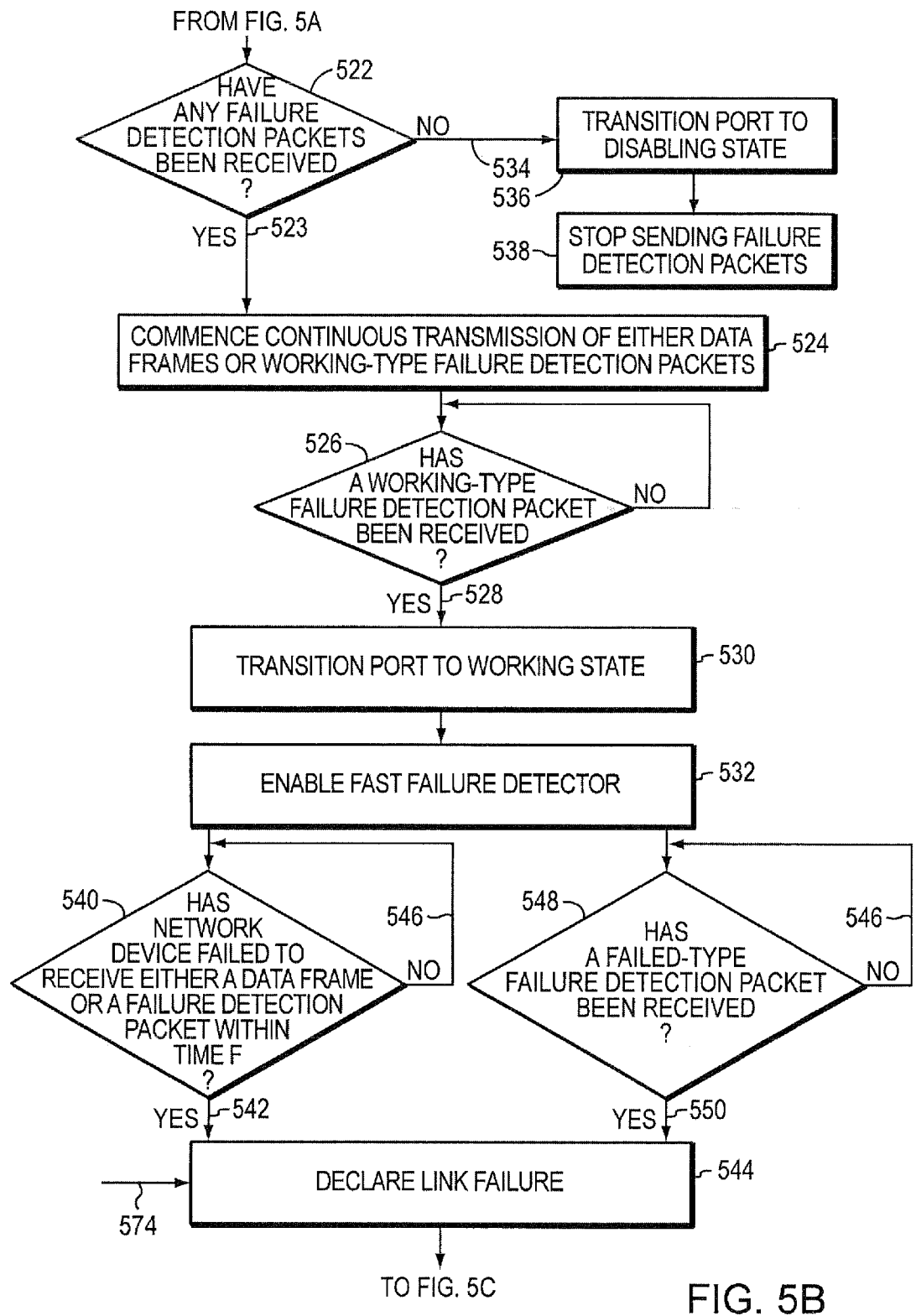
Figure 5C:
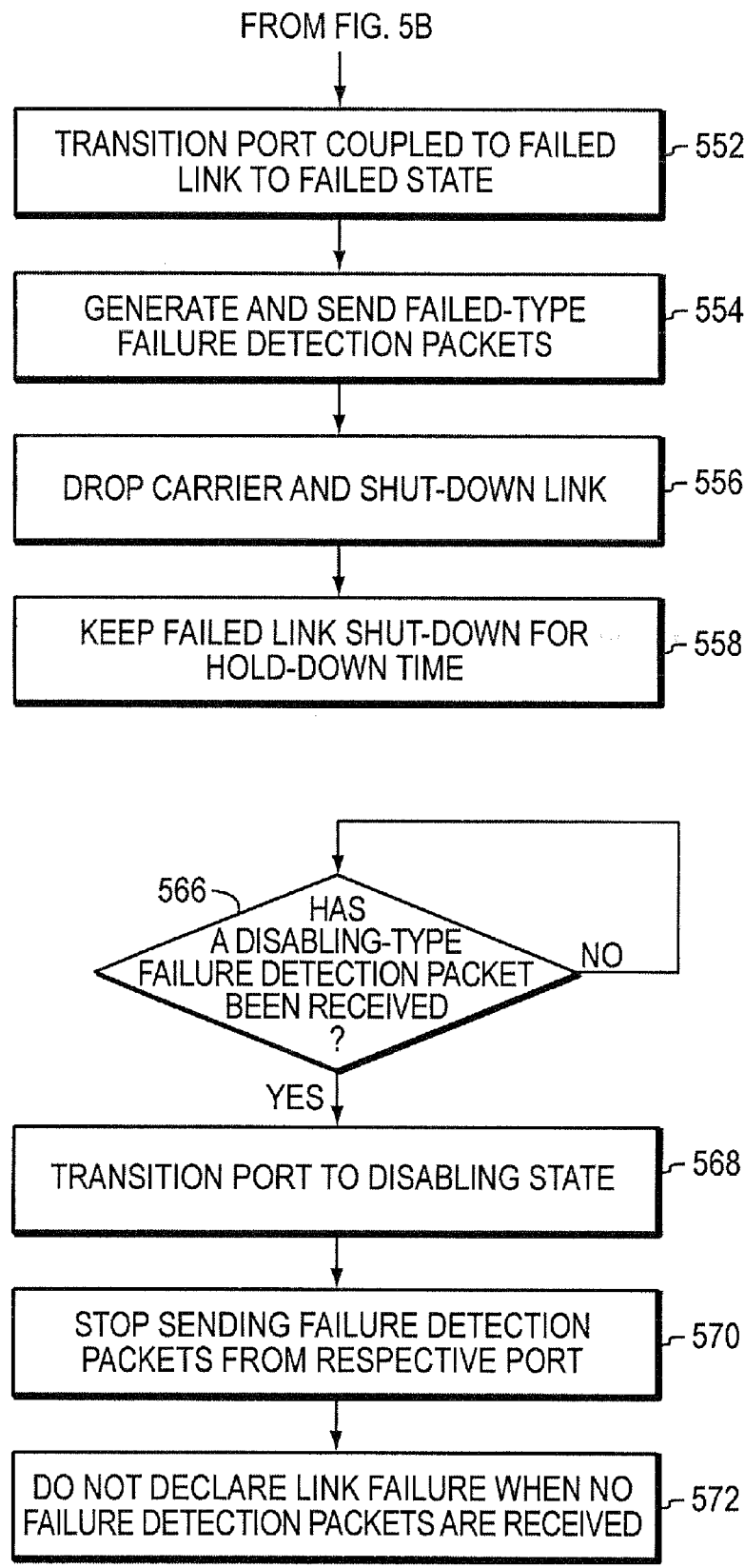

FIGS. 5A-C is a flow diagram of a preferred method in accordance with the present invention. First, a network device, such as network device 106, initializes the subject link, e.g., link 114, as indicated at block 502 (FIG. 5A). This typically includes powering up the link and establishing the carrier upon which the data signals will be sent, which may be a function of the frame transmission and reception object 204. Next, the respective port's MAC service is enabled, as indicated at block 504. Network device 106 causes the link establishment engine 208 to attempt to establish communication across link 114, as indicated at block 506. Link establishment engine 208 utilizes a conventional protocol to establish the link 114. Suitable link establishment protocols include the Port Aggregation Protocol described in commonly-owned U.S. Pat. No. 5,959,968 to Chin et al., the UniDirectional Link Detection (UDLD) Protocol from Cisco Systems, Inc., and IEEE Standards 802.1X (Port Access) or 802.3 ad (Link Aggregation Control Protocol). As part of the link establishment process, engine 208 determines bi-directionality, determines or assumes co-termination and may determine right-to-use features, among others, of link 114.

As indicated at decision block 508, the MAC entity 206 next determines whether the link 114 has been successfully established. If so, the MAC entity determines whether the failure detection engine 210 (for the port associated with the link) is enabled, as indicated by the Yes arrow 510 leading to decision block 512. More specifically, the MAC Control sub-layer 422 can be configured, as part of its start-up process, to enable or disable the failure detection engine 210 operating at sub-layer 424, as indicated by arrow 426 (FIG. 4), which illustrates the flow of commands from the MAC Control sub-layer 422 to the Failure Detection sub-layer 424. In an illustrative embodiment, a network administrator may adjust the settings at or configuration of network device 106 so as to cause the failure detection sub-layer 424 of device 106 to be enabled or disabled. Assuming failure detection has been enabled at device 106, failure detection is initialized as indicated by Yes arrow 514 leading to block 516.

As indicated by block 518, the failure detection engine 210 directs the state machine 214 to transition to the enabling state 302 (FIG. 3), thereby associating part 202b with the enabling failure detection state. The failure detection engine 210 also generates and sends one or more enabling-type failure detection packets from the port P1 202b, as indicated at block 520.

Figure 6:
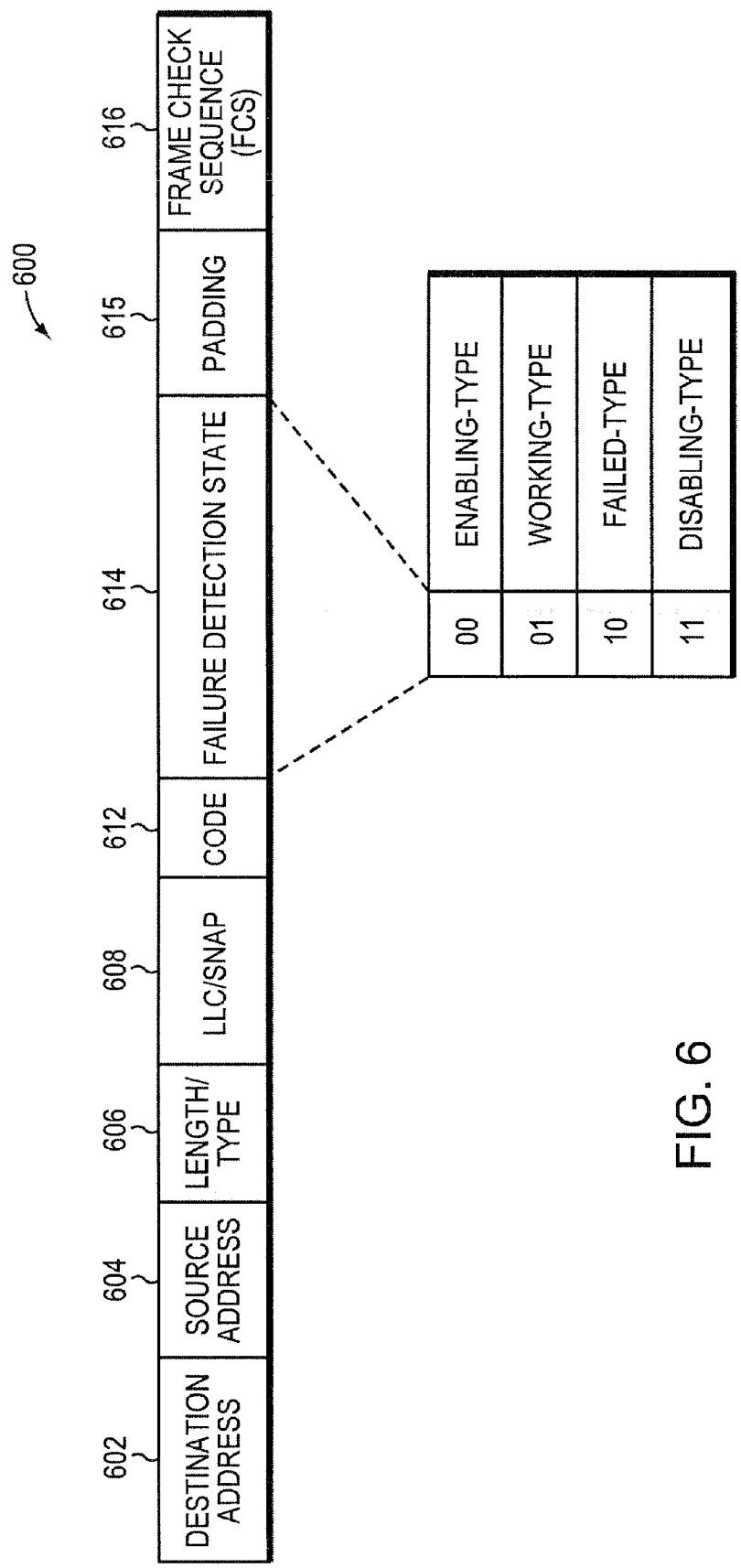
FIG. 6 is a highly schematic illustration of a preferred format of a failure detection packet in accordance with the present invention.

FIG. 6 is a highly schematic illustration of a preferred format of a failure detection packet 600. Failure detection packet 600 is made up of a plurality of fields, including a destination address (DA) field 602, a source address (SA) field 604, a length/type field 606 a LLC/SNAP (sub-network access protocol) field 608, a code field 612, a failure detection state field 614, a padding field 615 and a frame check sequence (FCS) field 616. The destination address field 602, which may be six octets, is preferably loaded with hexadecimal 01-80-C2-00-00-01. The source address field 604, which may be six-octets, is loaded with the MAC address associated with the port, e.g., port P1 202b, from which the respective failure detection packet 600 is being transmitted. The length/type field 606 is preferably a two-octet field, which is loaded with a value that specifies the length of packet 600. The LLC/SNAP field 608 is preferably a six-octet field which is loaded with a LLC value of hexadecimal AAAA0C, and an organization unique identifier (OUI) value of hexadecimal 00000C. The code field 612 is preferably a two-octet field, which is loaded with a predefined value that indicates the packet 600 as a failure detection packet. The failure detection state field 614 is preferably a one-octet field, which is loaded with a predetermined value, e.g., "00", indicating that this failure detection packet 600 is an enabling-type packet. The padding field 615 contains a sufficient number of "padding" octets to preferably make the total length of the packet 64 octets. Preferably, the octets contained in the padding field 615 are loaded with a value of zero. The FCS field 616 is loaded with an error correction value computed for the packet 600.

Figure 7:
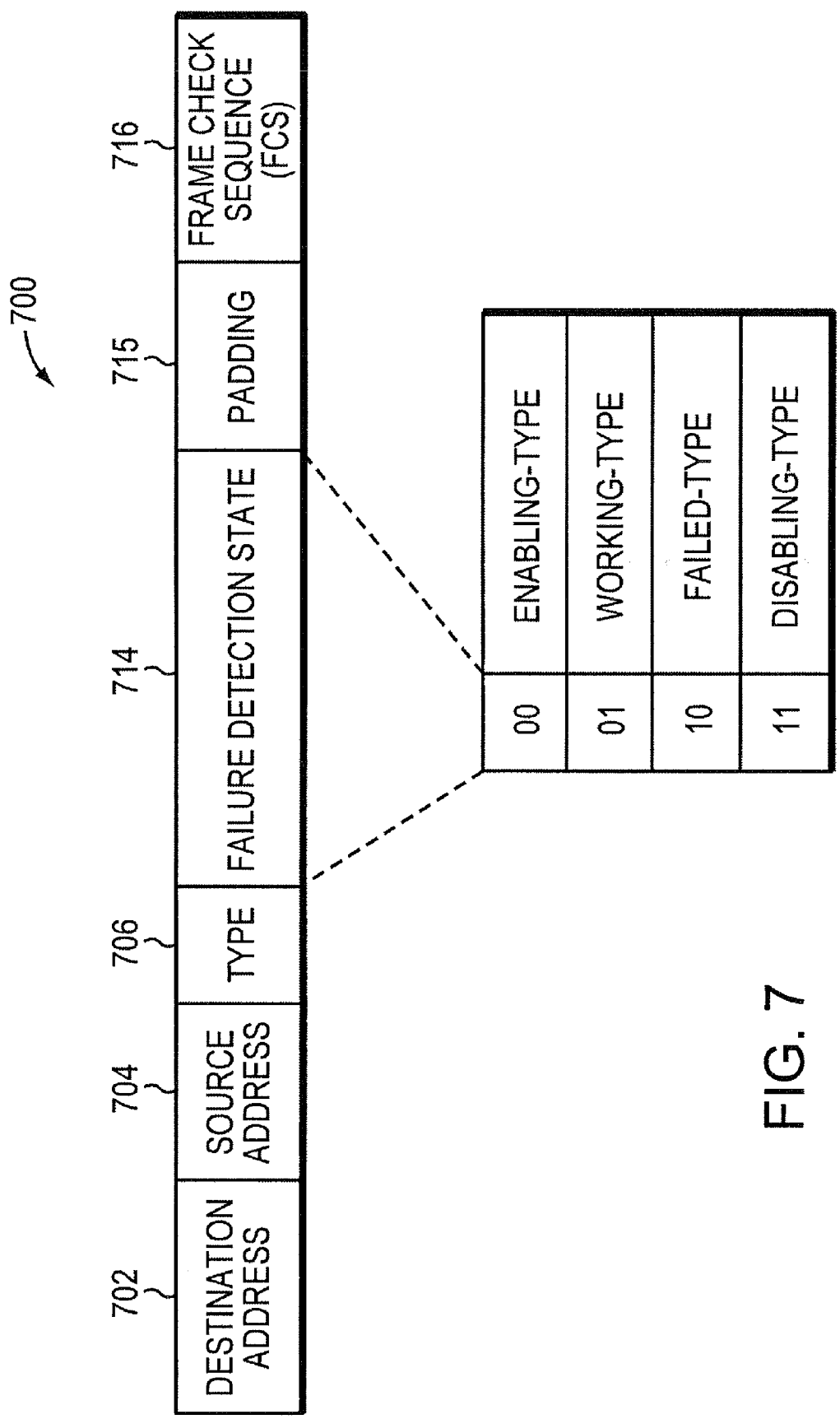
FIG. 7 is a highly schematic illustration of an alternate format of a failure detection packet in accordance with the present invention.

FIG. 7 is a highly schematic illustration of an alternate format of a failure detection packet 700 configuration that may be used with the present invention. Packet 700 contains a destination address field 702, a source address field 704, a type field 706, a failure detection state field 714, a padding field 715 and a FCS field 716. The destination address 702, source address 704, failure detection state 714, padding 715 and FCS 716 fields are preferably loaded with information as described above for the destination address 602, source address 604, failure detection state 614, padding 615 and FCS 616 fields, respectively. The type field is a 2-octet field, which is loaded with a special "Ethernet type" code (obtained from the IEEE Registration Authority) that identifies the packet as a failure detection packet.

Those skilled in the art will recognize that other packet formats may be used.

In addition to generating and transmitting one or more enabling-type failure detection packets 600, the failure detection engine 210 at device 106 also "listens" for any failure detection packets 600 that may be received from network device 108 via link 114, as indicated by decision block 522 (FIG. 5B).

Considering network device 108, the one or more enabling-type failure detection packets 600 from device 106 are received at its port P2 coupled to link 114 and, due to the destination address and length/type values contained in the received failure detection packets 600, they are passed to the failure detection engine disposed at device 108. Suppose that the failure detection engine of device 108 has also been enabled and initialized. Then, the receipt of an enabling-type failure detection packet causes the failure detection engine at device 108 to conclude that device 106 supports the failure detection protocol. In response, the failure detection engine at device 108 transitions the state machine associated with its port P2 to the working state 304, and generates and sends one or more working-type failure detection packets to device 106 via link 114. A working-type failure detection packet 600 is similar to the enabling-type packet described above, except that the failure detection state field 614 is loaded with a different value, e.g., "01", indicating that this failure detection packet 600 is a working-type packet. The working-type failure detection packet 600 from network device 108 is received at device 106, and passed to the failure detection engine 210.

Upon receiving a failure detection packet 600 from network device 108 via link 114, the failure detection engine 210 at device 106 concludes that device 108 participates in the failure detection protocol of the present invention. In response, network device 106 starts sending a continuous stream of network messages to device 108 via link 114, thereby keeping link 114 in a fully utilized condition. Specifically, the MAC entity 206 and failure detection engine 210 cooperate to ensure that device 106 continuously transmits something, i.e., either data (or control) frames or working-type failure detection packets 600, from port P1 202b for receipt by device 108 via link 114, as indicated by block 524 (FIG. 5B). In other words, as transmission of each frame finishes, MAC entity 206 at device 106 looks to see if it has another data/control frame, such as a data frame received from an upper layer of the protocol stack, for transmission to network device 108 via port P1 202b and link 114. If it has another such data/control frame, then that frame is transmitted. If the MAC entity 206 does not have another data/control frame for transmission, then the failure detection engine 210 generates a working-type failure detection packet 600 for transmission to network device 108. In this way, the MAC entity 206 and the failure detection engine 210 keep link 114 fully and continuously utilized, e.g., saturated, in the direction from network device 106 to device 108.

An exemplary data frame is a message sourced by server 116 (or by an entity disposed in sub-network A 102) and destined for workstation 118 (or for an entity disposed in sub-network B 104). An exemplary control frame is a configuration bridge protocol data unit (BPDU).

Meanwhile, the failure detection engine 210 at device 106 also constantly checks for the receipt of a working-type failure detection packet 600 from device 108, as indicated by decision block 526. Once device 106 receives its first working-type failure detection packet 600 from device 108, the failure detection engine 210 transitions the state machine to the working state 304, as indicated by Yes arrow 528 leading to block 530. Engine 210 also enables its fast failure detector logic 211, as indicated by block 532. In a similar manner, the failure detection engine at device 108 enables its fast failure detection logic 212 upon receiving a working-type failure detection packet 600 from device 106. At this point, fast failure detection in accordance with the present invention has been enabled on link 114 of network 100.

It should be understood, if network device 106, before sending any failure detection packets of its own, receives an enabling-type failure detection packet from device 108, that device 106 starts-out sending working-type failure detection packets. In addition, failure detection engine 210 preferably notifies one or more higher level protocols that port P1 202b is in the working state, and that failure detection has been enabled, as indicated by communication arrow 428 (FIG. 4).

Returning to decision block 522 (FIG. 5B), if network device 106 does not receive any failure detection packets from device 108, then the failure detection engine 210 concludes that device 108 is not configured to run the failure detection protocol of the present invention. In response, the failure detection engine 210 for port P1 202b at device 106 preferably transitions port P1 202b to the disabling state 306, as indicated by the No arrow 534 leading to block 536. The failure detection engine 210 also stops sending failure detection packets 600 to device 108, as indicated at block 538. Engine 210 may also notify one or more of the higher-level protocols that failure detection was not enabled.

It should be understood that the steps of blocks 516-530 and 536-538 represent an auto-negotiation process or phase through which two network devices at opposite ends of a point-to-point link can automatically determine that they are each configured and enabled to run the failure detection process of the present invention, or that one of them is not so configured.

Once enabled, the fast failure detector logic at devices 106 and 108 monitor the health of link 114. In the illustrative embodiment, the fast failure detector logic monitors the health of link 144 in two ways. First, they confirm that a continuous stream of network messages, i.e., either data, control or failure detection packets, are being received by the respective network device via link 114. Any interruption in this continuous stream will be immediately detected and considered to be a failure of the link 114. As indicated above, failure detection packets 600 received by a network device are processed its failure detection engine 210, which is configured to operate at the new failure detection sublayer 424. Data (and other control) frames, on the other hand pass through the failure detection sub-layer 424 up to the MAC Control sub-layer 422. Accordingly, by having the failure detection engine operate at its own sub-layer that is disposed between the MAC 418 and MAC Control 422 sub-layers, the fast failure detector logic 211 of engine 210 "sees" a continuous stream of network messages being received on port P1 202b from device 108 via link 114.

Preferably, upon receiving a data frame or a failure detection packet 600, the fast failure detector 211 at each network device starts a timer (not shown), which may be programmed with a preset limit, e.g., "F". Each time the fast failure detector 211 receives another data frame or failure detection packet 600, it re-starts this timer. As indicated by decision block 540 (FIG. 5B), if the timer expires before network device 106 receives another data frame or failure detection packet on this port, then the fast failure detection logic 211 declares a link failure, as indicated by Yes arrow 542 leading to block 544. If another data, control or failure detection packet is receive before the timer expires, the timer is re-started and no link failure is declared, as indicated by No arrow 546, which loops-back on decision block 540.

Link failures are preferably declared under other conditions as well. For example, another way in which the fast failure detection logic 211 declares a link failure is in response to a loss of the carrier signal. Preferably, the loss of the carrier signal is reported to the failure detection logic 211, which declares a link failure as indicated at block 544. Yet another way in which the fast failure detection logic 211 monitors the health of link 114 is by checking for the receipt of any failed-type failure detection packets 600 from device 108, as indicated by decision block 548. As illustrated in FIG. 4, a failed-type failure detection packet 600 preferably has its failure detection state field 614 set to a predetermined value, e.g., "10". Failure detection engines are configured to recognize such packets as failed-type packets. If such a failure detection packet is received, the fast failure detection logic 211 declares a link failure, as indicated by Yes arrow 550 also leading to block 544.

Upon declaring a link failure, the failure detection engine 210 transitions the state machine associated with the port to the failed state 308, as indicated at block 552 (FIG. 5C). The failure detection engine 210 at device 106 also notifies the network device, e.g., device 108, at the other end of the failed link, e.g., link 114, of the failure. Specifically, the failure detection engine 210 generates one or more, e.g., two, failed-type failure detection packets 600, and transmits them from its port coupled to the failed link, e.g., link 114, for receipt by the other device, e.g., device 108, as indicated at block 554. Next, the failure detection engine 210 causes the carrier to be dropped and the link 114 to be shutdown, as indicated at block 556. In the illustrative embodiment, the failure detection engine 210 also prevents the link from being re-activated for a hold-down time that may be preset, as indicated at block 558. A suitable value for the hold-down time is on the order of 3.0 seconds, although those skilled in the art will recognize that other values may be utilized. The failure detection engine 210 may also notify one or more higher layer protocols, such as the Spanning Tree Protocol, of the failure, as illustrated by communication arrow 428 (FIG. 4).

Upon receiving the failed-type failure detection packets 600 from device 106, the failure detection engine at device 108 similarly declares the link to be failed, drops carrier, and shuts-down the link. The failure detection engine at device 108 also keeps the failed link shut-down for at least the hold-down time.

Upon expiration of the shut-down time, the network devices 106 and 108 may attempt to re-start the failed link 114. That is, the link establishment engines of devices 106 and 108 power-up the link, enable the MAC service and attempt link establishment, as indicated by previously described blocks 502-506 (FIG. 5A). Referring to decision block 508 (FIG. 5A), if link establishment is unsuccessful, the failure detection technique of the present invention is preferably not enabled, as indicated by No arrow 560 leading to end block 562. In other words, if the link cannot be successfully established, then the failure detection engines are never enabled. Furthermore, if failure detection is not enabled at the respective network device, processing similarly terminates as indicated by No arrow 564 also leading to end block 562.

In a further aspect of the present invention, a failure detection engine, such the engine at device 108, can also disable or "turn-off" failure detection while a link, such as link 114, is up and running. For example, suppose an application or protocol operating at a higher level than the failure detection sub-layer 424 issues a command to the failure detection engine at device 108 directing it to stop running failure detection. In response, the failure detection engine at device 108 preferably generates and transmits one or more failed-type failure detection packets 600 to device 106. The failed-type failure detection packets has the same format as the other failure detection packets, except that the failure detection state field is loaded with a predefined value, e.g., "11", indicating that it is a disabling-type packet 600.

The failure detection engine 210 at device 106 watches for the receipt of any disabling-type failure detection packets 600, as indicated by decision block 566 (FIG. 5C). When device 106 receives the disabling-type failure detection packet 600, it preferably causes the state machine associated with port P1 202b to transition to the disabling state 306, as indicated by block 568. Engine 210 also stops generating and sending working-type failure detection packets 600 to device 108 via link 114, as indicated by block 570. Thus, if device 106 has no data or control packets to send to device 108 via link 114, the link 114 will be become idle. That is, device 106 will no longer be transmitting a continuous stream of network messages to device 108 via link 114. The failure engine at device 108, after transmitting the one or more disabling-type failure detection packets, also stops sending failure detection packets to device 106. Thus, device 106 will also no longer be receiving a continuous stream of data, control or failure detection packets from device 108. Nonetheless, with the state machine associated with port P1 202*b* of device 106 in the disabling state 306, any such interruptions or breaks in the receipt of network messages from device 108 via link 114 will no longer cause a link failure to be declared, as indicated by block 572. In this way, the failure detection engines can terminate operations without having to shut-down or suspend link 114.

In addition to stopping the transmission of failure detection packets, the failure detection engine may also notify one or more higher-level protocols that failure detection operations have ceased on link 114.

In yet another aspect of the present invention, a link can be intentionally failed. Suppose, for example, that a protocol or application at device 106 detects a failure, such as a loss of carrier, too many CRC errors, etc. and/or wishes to have link 114 shutdown. The protocol or application can cause a command to be sent to the failure detection engine 210, e.g., as indicated by arrow 426. In response to this command, the failure detection engine 210 declares a link failure, as indicated by arrow 574 (FIG. 5B) entering block 544. The failure detection engine 210 then performs the steps illustrated by previously described blocks 552-558, resulting in the link being shutdown and kept shutdown for the hold-down time.

The IEEE 802.3X specification standard defines a Pause frame. If a device sends a Pause frame to another device, the receiving device stops sending frames. In the preferred embodiment of the present invention, failure detection packets continue to be sent notwithstanding the receipt of the Pause frame. This may be achieved by placing the failure detection engine 210 below the 802.3X Pause engine in the MAC stack. In this way, the Pause frame only affects frames above the 802.3X Pause engine, e.g., data/control frames, in the MAC stack.

It should be understood that rather than having a single set of states as illustrated in FIG. 3, there may be plurality of receive and transmit states. For example, the receive states may include a notifying, which is used to notify higher layer protocols that the transmission and recognition of failure detection packets have stopped, an enabling state, which is used when enabling-type failure detection packets are being transmitted and the failure detection engine is awaiting receipt a failure detection from the device at the other end of the link, a disabled state, which is used when the failure detection engine has yet to be activated, a working state, which is used after at least one enabling-type or working-type failure detection packet has been received from the device at the other end of the link, a disabling state, which is used when a higher layer protocol has issued a command to disable failure detection and at least one disable-type failure detection packet has been sent, a fail_detected state, which is used when a link failure has been detected so as to trigger the transmission of a failed-type failure detection packet, and a fail_forced state, which is used when a failed-type failure detection packet has been received.

Similarly, the transmit states may include a reset state, which is used as a holding state until a reset variable is released, a waiting_for_idle state, which is used while waiting for the transmitter to finish transmitting a frame, a transmit_data state, which is used to initiate transmission of a data or control frame and remembers that a data or control frame as opposed to a failure detection packet was the last thing sent, a decrement state, which is used count the failure detection packet that is about to be sent, a transmit_failure_detection state, which is used to initiate the transmission of a failure detection packet and remembers that a failure detection packet was the last thing to be sent, a resetting state, which is used drop carrier, shutdown the link and start the hold-down timer, and a stop state, which is used after carrier has been dropped to notify upper layers so that re-establishment of the link can be attempted.

The transmit_data, transmit_failure_detection, and decrement states may be used along with predefined variables to ensure that a network device alternates between data or control frames and failure detection packets during the auto-negotiation phase. This ensures that failure detection negotiation occurs and will not be preempted by, e.g., a continuously running stream of data and/or control frames.

Those skilled in the art will further recognize that the failure detection process of the present invention may be configured to inter-operate in various ways with existing protocols and network device operation. For example, the failure detection engine 210 may be configured to abort the transmission of a data or control frame in order to send a failed-type failure detection packet. Similarly, the transmission of IEEE 802.3X Pause frames may inhibit the transmission of failure detection packets during auto-negotiation.

It should be noted that in the above-described illustrated embodiment, the inventive technique is described as applied to a point-to-point link 114 (FIG. 1) between two intermediate nodes. This is not, however, intended to be a limitation of the invention. Other point-to-point links between other types of network entities may take advantage of the present invention. For example, the inventive technique may be employed by end stations, such as end stations 116 and 118, to monitor the operation of their respective links, such as links 115 and 117, and to detect failures of those links.

The foregoing description has been directed to specific embodiments of this invention. It will be apparent, however, that other variations and modifications may be made to the described embodiments, with the attainment of some or all of their advantages. For example, other formats of the failure detection packets may be used. In particular, failure detection packets could be modified to include information as to why the link was failed, e.g., too many CRC errors. Therefore, it is an object of the appended claims to cover all such variations and modifications as come within the true spirit and scope of the invention.

What is claimed is:

1. In a network entity configured to be disposed within a computer network and to be connected by a point-to-point link to a second network entity, a method for detecting failures in the point-to-point link, the method comprising:

exchanging signals with the second network entity, wherein the signals are utilized to auto-negotiate that the network entity and the second network entity both support failure detection processes and, in response thereto, to enable failure detection by the failure detection processes at the two network entities, the exchanging to include generating one or more first type of failure detection packets, sending the one or more first type of failure detection packets to the second network entity via the point-to-point link, receiving from the second network entity on the point-to-point link one or more second type of failure detection packets, in response to receiving the one or more second type of failure detection packets from the second network entity, generating one or more second type of failure detection packets, and sending the one or more second type of failure detection packets to the second network entity;

transmitting to the second network entity a continuous stream of network messages on the point-to-point link;

receiving from the second network entity a continuous stream of network messages on the point-to-point link;

detecting an interruption in the continuous stream of network messages being received on the point-to-point link from the second network entity; and in response to detecting the interruption, declaring the point-to-point link failed.

2. The method of claim 1 wherein, the first type of failure detection packets indicate that a failure detection process exists at the network entity transmitting the first type of failure detection packets, and the second type of failure detection packets indicate that the failure detection process at the network entity transmitting the second type failure detection packet has concluded that failure detection processes exist at both of the network entities and are to be enabled.

3. The method of claim 1 further comprising notifying a protocol of the failure of the point-to-point link.

4. The method of claim 3 wherein the notified protocol is a Spanning Tree Protocol.

5. The method of claim 1 wherein the network entity is one of an end station and an intermediate network device.

6. The method of claim 1 further comprising exchanging second signals with the second network entity, wherein the second signals are utilized to terminate operation of the failure detection processes at the two network entities, and operation of the failure detection processes are terminated without having to shut-down the point-to-point link.

7. The method of claim 1, wherein the point-to-point link has a carrier for transmitting information and the method further comprises:

after declaring the point-to-point link failed, dropping the carrier.

8. The method of claim 1 wherein the continuous stream of network messages transmitted between the first and second network entities comprises data packets or control packets or both, as well as failure detection packets, wherein the failure detection packets are transmitted when data packets or control packets are not being transmitted to ensure a continuous stream is being transmitted.

9. The method of claim 1 further comprising, in response to detecting the interruption, notifying the second network entity that the point-to-point link has failed.

10. The method of claim 1, wherein the point-to-point link has a carrier for transmitting information, and the method further comprises:

following the step of declaring the point-to-point link to have failed, dropping the carrier;

causing the point-to-point link to be shut-down; and preventing the point-to-point link from being re-established for a hold-down time.

11. An apparatus comprising:

at least one port for sending and receiving network messages, wherein the at least one port is configured to connect to a second apparatus via a point-to-point link; and a failure detection engine in communicating relationship with the at least one port, the failure detection engine configured to auto-negotiate that the apparatus and the second apparatus both support failure detection and, in response thereto, to enable failure detection at the apparatus and the second apparatus, the failure detection engine including:

a packet generator configure to produce one or more failure detection packets for transmission over the point-to-point link to the second apparatus to indicate that the failure detection engine disposed at the apparatus is operational, wherein the one or more failure detection packets generated to indicate that the failure detection engine at the apparatus is operational are of a first type, and fast failure detector logic configured to listen for one or more failure detection packets to be received from the second apparatus over the point-to-point link to indicate that the failure detection engine disposed at the second apparatus is operational, the one or more failure detection packets to be received from the second apparatus to indicate that the failure detection engine disposed at the second apparatus is operational are of a second different type, and in response to receipt of the one or more failure detection packets, to thereafter listen for a continuous stream of network messages to be received from the second apparatus, and to identify a failure in the point-to-point link in response to an interruption in the stream of network messages being received from the second apparatus.

12. The apparatus of claim 11 further comprising:

at least one forwarding engine for identifying one or more destination ports from which a received network message is to be sent.

13. The apparatus of claim 11 wherein the point-to-point link operates according to an Ethernet specification standard.

14. The apparatus of claim 11 wherein the continuous stream of network messages received from the second apparatus comprises data packets or control packets or both, as well as failure detection packets, wherein the failure detection packets are received when data packets or control packets are not, as part of the continuous stream of network messages.

15. The apparatus of claim 11 wherein the failure detection engine further comprises a state machine configured to transition among a plurality of states depending on operation of the failure detection engine, the plurality of states including an enabling state entered into when failure detection is operational at the apparatus, and a working state entered into when failure detection is operational at both the apparatus and the second apparatus.

16. The apparatus of claim 11, wherein the point-to-point link has a carrier for transmitting information, and the fast failure detector logic is further configured to drop the carrier in response to identification that the point-to-point link has failed, cause the point-to-point link to be shut-down, and prevent the point-to-point link from being re-established for a hold-down time.

* * * * *